(12) United States Patent
Kramer et al.

(10) Patent No.: US 8,525,361 B1
(45) Date of Patent: Sep. 3, 2013

(54) PNEUMATIC ENERGY HARVESTING DEVICES, METHODS AND SYSTEMS

(75) Inventors: Marcus Kramer, San Diego, CA (US); Dragan Nikolic, La Jolla, CA (US); Eric M. Gawehn, Mountain View, CA (US); Harry Sim, San Jose, CA (US)

(73) Assignee: Cypress Envirosystems, Inc., San Jose, CA (US)

( * ) Notice: Subject to any disclaimer, the term of this patent is extended or adjusted under 35 U.S.C. 154(b) by 789 days.

(21) Appl. No.: 12/574,422

(22) Filed: Oct. 6, 2009

Related U.S. Application Data

(63) Continuation-in-part of application No. 12/317,347, filed on Dec. 22, 2008.

(60) Provisional application No. 61/103,022, filed on Oct. 6, 2008.

(51) Int. Cl.
  *F02G 1/04* (2006.01)
  *F02C 3/00* (2006.01)

(52) U.S. Cl.
  USPC .................................. 290/43; 290/52; 60/508

(58) Field of Classification Search
  USPC ................. 290/43, 44, 54, 55, 52; 60/2, 508, 60/659
  See application file for complete search history.

(56) References Cited

U.S. PATENT DOCUMENTS

| | | | |
|---|---|---|---|
| 3,037,702 A | 5/1962 | Mauer et al. | |
| 4,158,145 A * | 6/1979 | Kartsounes et al. | 290/52 |
| 4,610,263 A | 9/1986 | Barnes | |
| 4,898,200 A | 2/1990 | Odajima et al. | |
| 5,114,070 A * | 5/1992 | Lilja et al. | 236/49.3 |
| 5,306,116 A | 4/1994 | Gunn et al. | |
| 5,310,070 A | 5/1994 | Haas et al. | |
| 5,310,111 A | 5/1994 | Linck | |
| 5,337,560 A * | 8/1994 | Abdelmalek | 60/370 |
| 5,634,590 A | 6/1997 | Gorski et al. | |
| 6,239,501 B1 * | 5/2001 | Komarechka | 290/1 R |
| 6,281,594 B1 * | 8/2001 | Sarich | 290/1 R |
| 6,606,860 B2 * | 8/2003 | McFarland | 60/648 |
| 6,863,356 B2 | 3/2005 | Hackl et al. | |
| 6,889,700 B2 | 5/2005 | George | |
| 6,933,655 B2 | 8/2005 | Morrison et al. | |
| 7,086,231 B2 * | 8/2006 | Pinkerton | 60/650 |
| 7,157,802 B2 * | 1/2007 | Bodkin | 290/1 R |
| 7,161,276 B2 | 1/2007 | Face | |
| 7,256,505 B2 | 8/2007 | Arms et al. | |

(Continued)

FOREIGN PATENT DOCUMENTS

WO 2008125866 A1 10/2008

OTHER PUBLICATIONS

"Millenial Net Announces Intelligent Energy Conservation Solution for Commercial and Industrial HVAC Environments", Press Release; Jun. 9, 2008; archived found at Internet http://news.thomasnet.com/fullstory/545609.

(Continued)

*Primary Examiner* — Nicholas Ponomarenko
(74) *Attorney, Agent, or Firm* — Manuel de la Cerra

(57) ABSTRACT

An energy harvesting device may include a pneumatic system inlet configured to receive a pressurized gas; a pneumatic-to-electrical (PN/E) transducer that converts a flow of the pressurized gas into generated electrical energy; and an electrical device coupled to receive the electrical energy of the PN/E transducer.

20 Claims, 11 Drawing Sheets

(56) References Cited

U.S. PATENT DOCUMENTS

| | | |
|---|---|---|
| 7,260,417 B2 | 8/2007 | El-Batal et al. |
| 7,379,800 B2 | 5/2008 | Breed |
| 7,400,253 B2 | 7/2008 | Cohen |
| 7,429,801 B2 | 9/2008 | Adamson et al. |
| 7,501,726 B1 | 3/2009 | Waters et al. |
| 7,514,804 B2 | 4/2009 | Wang |
| 7,546,232 B2 * | 6/2009 | Brooks et al. ............ 702/183 |
| 7,832,207 B2 * | 11/2010 | McBride et al. ............ 60/410 |
| 7,898,097 B1 * | 3/2011 | Fries et al. ............ 290/1 A |
| 7,963,110 B2 * | 6/2011 | Bollinger et al. ............ 60/410 |
| 7,999,404 B1 * | 8/2011 | Fries et al. ............ 290/1 R |
| 8,013,463 B2 * | 9/2011 | Preston ............ 290/54 |
| 8,065,874 B2 * | 11/2011 | Fong et al. ............ 60/417 |
| 8,072,089 B2 * | 12/2011 | Krouse et al. ............ 290/54 |
| 8,196,395 B2 * | 6/2012 | Fong et al. ............ 60/370 |
| 8,234,868 B2 * | 8/2012 | Bollinger et al. ............ 60/682 |
| 8,240,146 B1 * | 8/2012 | Bollinger ............ 60/508 |
| 8,302,403 B2 * | 11/2012 | Engle et al. ............ 60/727 |
| 2005/0278074 A1 | 12/2005 | Junk et al. |
| 2006/0176158 A1 | 8/2006 | Fleming |
| 2008/0154436 A1 | 6/2008 | Krippner et al. |
| 2009/0192653 A1 | 7/2009 | Songukrishnasamy et al. |
| 2009/0302249 A1 | 12/2009 | Fincher |
| 2011/0166712 A1 | 7/2011 | Kramer et al. |

OTHER PUBLICATIONS

Mendler, Sandra et al., "The Greening Curve—Lessons Learned in the Design of the New EPA Campus in North Carolina", U.S. Environmental Protection Agency, Nov. 2001 (available at Internet: http://www.epa.gov/rtp/campus/environmental/thegreeningcurve-new.pdf).

"Millennial Net Announces Intelligent Energy Conservation Solution for Commercial and Industrial HVAC Environments," Press Release, Jun. 9, 2008, archive found at http://news.thomasnet.com/fullstory/545609.

Mendler et al., "The Greening Curve—Lessons Learned in the Design of the New EPA Campus in North Carolina," US Envirnomental Protection Agency, Nov. 2001, available at http://www.epa.gov/rtp/campus/environmental/thegreeningcurve-new.pdf.

International Search Report issued in International Application No. PCT/US08/013977 dated Feb. 12, 2009.

Written Opinion issued in International Application No. PCT/US08/013977 dated Feb. 4, 2009.

International Preliminary Report on Patentability issued in International Application No. PCT/US08/013977 dated Aug. 3, 2010.

Prosecution History from U.S. Appl. No. 61/024,231, filed Jan. 29, 2008 (History from Jan. 29, 2008 to Feb. 2, 2008; 26 pages).

Prosecution History from U.S. Appl. No. 61/315,355, filed Mar. 18, 2010 (History from Mar. 18, 2010 to Apr. 13, 2010; 25 pages).

* cited by examiner

US 8,525,361 B1

PNEUMATIC ENERGY HARVESTING DEVICES, METHODS AND SYSTEMS

This application is a continuation-in-part of U.S. patent application Ser. No. 12/317,347 filed on Dec. 22, 2008, and this application claims the benefit of U.S. provisional patent application Ser. No. 61/103,022 filed on Oct. 6, 2008. The contents of both of these applications are incorporated by reference herein.

TECHNICAL FIELD

The present disclosure relates generally to pneumatic systems, and more particularly to devices that harvest electrical energy from pneumatic systems.

DETAILED DESCRIPTION

Various embodiments will now be described in detail that show devices, systems and methods that may harvest energy from pneumatic systems. A pneumatic system may operate by providing a pressurized gas (e.g., air) to various locations, where such pressurized gas may power various pneumatic devices, or be monitored by pneumatic devices. One example of a pneumatic system may be a pneumatic heating, ventilation and air conditioning (HVAC) system.

Embodiments may harvest pneumatic energy by capturing pressurized gas flows that might otherwise be wasted, by being vented to atmosphere, or re-circulated for subsequent re-pressurization. Accordingly, embodiments may be deployed at existing sites having pneumatic systems to provide locally generated electrical energy for various devices. Accordingly, automation and/or remote monitor and control devices may be employed that are powered according to the various embodiments, or equivalents.

Figure 1:
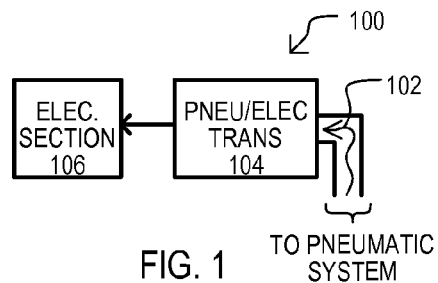
FIG. 1 is a block diagram showing a pneumatic energy harvesting device according to an embodiment.

Referring to FIG. 1, a pneumatic energy harvesting device according to one embodiment is shown in a block diagram and designated by the general reference character 100. A device 100 may include a pneumatic system inlet 102, a pneumatic-to-electrical (PN/E) transducer 104, and an electrical section 106. A pneumatic system inlet 102 may receive a pressurized gas from a pneumatic system. In one particular embodiment, a pneumatic system may be an existing system deployed at a site (e.g., building, or building complex).

A PN/E transducer 104 may convert a flow of pressurized gas into electrical energy. In particular embodiments, a PN/E transducer may convert a flow of pressurized gas into mechanical energy, and then convert such mechanical energy into electrical energy with a generator, or the like.

An electrical section 106 may be a device that provides one or more predetermined functions in response a supply of electrical energy. In particular embodiments, an electrical device may include a pneumatic based controller, including a wireless pneumatic thermostat (WPT) like those described in U.S. patent application Ser. No. 12/317, 347 filed on Dec. 22, 2008 (already incorporated by reference above), and equivalents. An electrical section 106 may receive electrical power from PN/E transducer 104 by way of an electrical connection 108. In particular embodiments, an electrical section 106 may be proximate to PN/E transducer 104. This may allow electrical section 106 to be located at positions based on a pneumatic system supply locations, as opposed requiring locations proximate to an electrical power supply (e.g., power outlets, power wiring).

In this way, a device may power an electrical section utilizing gas flow present in a pneumatic system.

Figure 2:
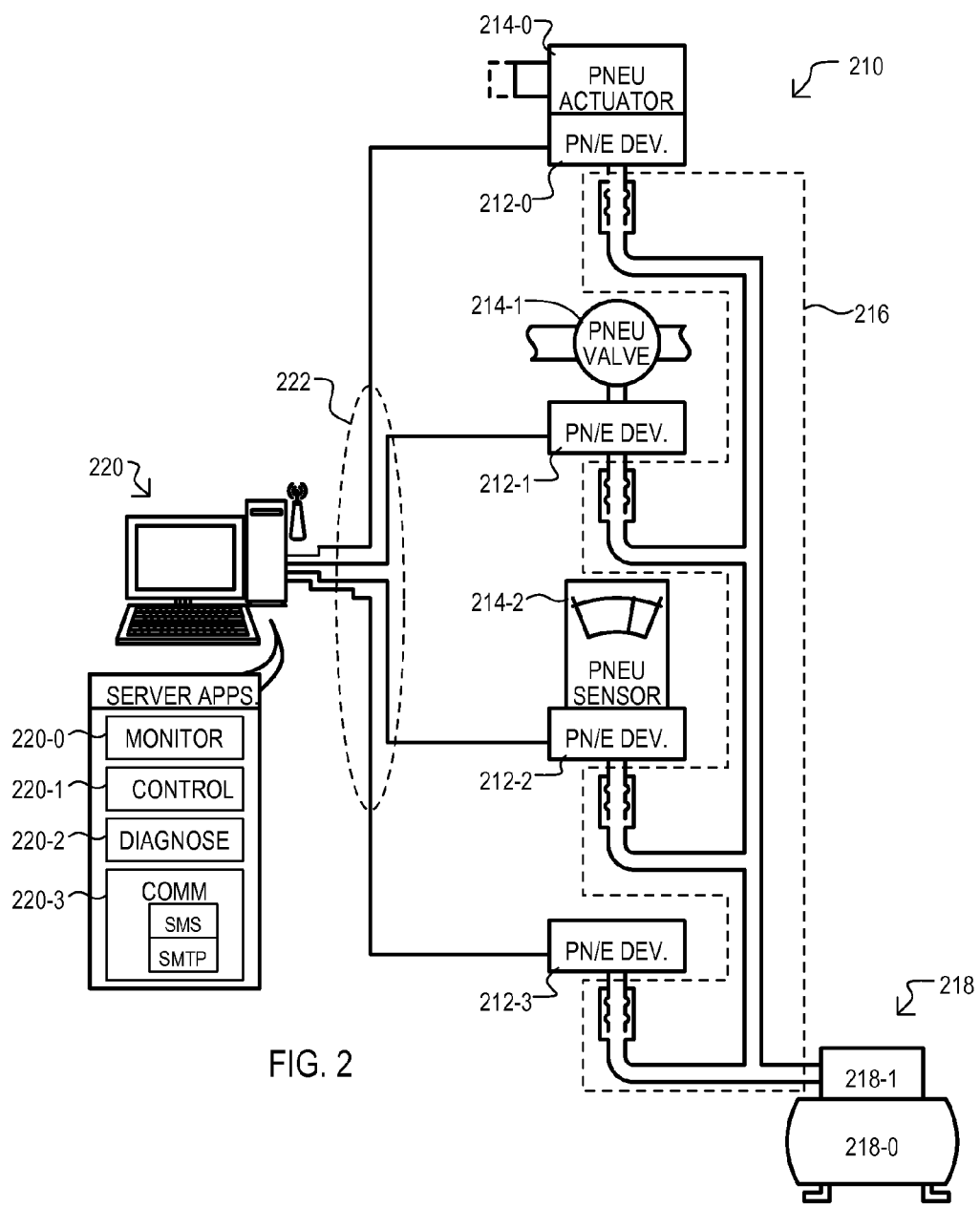
FIG. 2 is a block diagram showing systems that may include pneumatic harvesting devices according to embodiments.

Referring to FIG. 2, systems according to various embodiments are shown in a block diagram and designated by the general reference character 210. A system 210 may include a number of PN/E devices connected with corresponding pneumatic devices. Such pneumatic devices may provide functions in response to the same flow of pressurized gas utilized by a corresponding PN/E transducer to generate electrical energy.

In the particular embodiment of FIG. 2, a system 210 may include a number of PN/E devices 212-0-3, pneumatic devices 214-0-2, a pneumatic network 216, a pressurized gas source 218, and a controller device 220. PN/E devices 212-0-3 may receive a flow of pressurized gas from pneumatic network 216, and in response to such a flow, generate electrical energy. In some embodiments, PN/E devices 212-0-3 may include electrical sections powered by generated electrical energy. Still further, in particular embodiments, PN/E devices 212-0-2 may provide additional functions complementary to the corresponding pneumatic device 214-0-2. In one embodiment, any or all of PN/E devices 212-0-3 may have structure like the device of FIG. 1 or an equivalent. As shown by PN/E device 212-3, in some embodiments a PN/E device may not have a corresponding pneumatic device.

Pneumatic devices 214-0-2 may perform predetermined functions, other than generating electrical energy, in response to a pressurized gas input from pneumatic network 216. Pneumatic devices 214-0-2 may correspond to PN/E device 212-0-2, respectively. A pneumatic device may be disposed at various locations with respect to a corresponding PN/E device. In one embodiment, a pneumatic device may be disposed "downstream" from the corresponding PN/E device. That is, a pneumatic device may receive an output (e.g., exhaust, vent) flow from a PN/E device. In another embodiment, a pneumatic device may be "upstream" from the corresponding PN/E device. In such a case, a corresponding PN/E device may generate electrical energy from an output flow of the pneumatic device. In still another embodiment, a pneumatic device may be "parallel" to the corresponding PN/E device. In such a case, input flow may be split, with one flow path entering the PN/E device while another flow is utilized by a PN/E device to generate electrical energy.

FIG. 2 shows very particular examples of pneumatic devices any or all of which may be included in a system according to an embodiment. Pneumatic device 214-0 may include a pneumatic actuator that initiates a mechanical displacement in response to a pneumatic control input, and optionally in response to pneumatic power. A pneumatic control input may control actuation according to a pressure of an input flow. Pneumatic power (as opposed to control) may be provided from separate pressure source than that which provides pneumatic control values.

Pneumatic device 214-1 may include a pneumatic valve that may open/close and/or switch flow paths in response to an input control flow.

Pneumatic device 214-2 may include a pneumatic sensor that provides a reading in response to an input control flow. In one particular embodiment, a pneumatic sensor may include a pneumatic thermostat, even more particularly a wireless pneumatic thermostat such as those noted above.

A pneumatic network 216 may be a network of flow paths for a pressurized gas, including valves, vents, regulators, or other components not explicitly shown in FIG. 2. A pneumatic network 216 may receive a pressurized gas from a source 218, and deliver such a pressurized gas to PN/E devices 212-0-3 and corresponding pneumatic devices 214-0-2.

A pressurized gas source 218 may include a mechanical device that pressurizes a gas (e.g., air) within pneumatic network 216. In one very particular example, a pressurized gas source 218 may include a compressor 218-0 and a regulator 218-1. A compressor 218-0 may provide a compressed gas to regulator 218-1. Regulator 218-1 may regulate a received pressurized gas to provide such a gas at one or more predetermined pressures or pressure ranges.

A control device 220 may be connected any or all of PN/E devices 212-0-3 by communication links 222. Communication links 222 may be wired links, wireless links, or a combination thereof. In the case of wireless links, such links may include one or more repeaters (not shown) for increasing signal range. A control device 220 may have one-way or two-way communication with corresponding PN/E devices 212-0-3. In a particular "one-way" embodiment, a PN/E device may transmit data to control device 220, where such data may include information regarding the operation of the PN/E device 212-0-3 and/or the operation of a corresponding pneumatic device 214-0-2. In a particular "two-way" embodiment, a control device 220 may transmit information to PN/E devices, and such information may include control commands to control the operation of the PN/E devices 212-0-2. In response, PN/E devices 212-0-3 may return acknowledgements and/or operational data as in the one-way embodiment noted previously.

A control device 220 may include circuits for executing particular functions for monitoring, controlling, or diagnosing operations of PN/E devices. In the particular embodiment of FIG. 2, a control device 220 may be server having wired or wireless communication with PN/E devices. Such a server may include monitor functions 220-0, control functions 220-1, diagnosis functions 220-2, and communication functions 220-3. Such functions may be realized by instructions stored on machine readable media, and executable by one or more processor devices. Examples of such instructions are shown in more detail in FIG. 3.

Referring still to FIG. 1, a communication function 220-3 may include a network messaging service for forwarding data to remote locations on a predetermined network and according to one or more predetermined protocols. In the very particular embodiment of FIG. 2, communication function 220-3 may include a text message service (SMS) and an Internet email service (SMTP). Messages may include alarms, or data values corresponding to operations of PN/E devices 212-0-3, as but two of many possible examples.

In this way, a system may include multiple PN/E devices connected at pneumatic system outputs for other pneumatic devices, and in communication with a control device.

Figure 3:
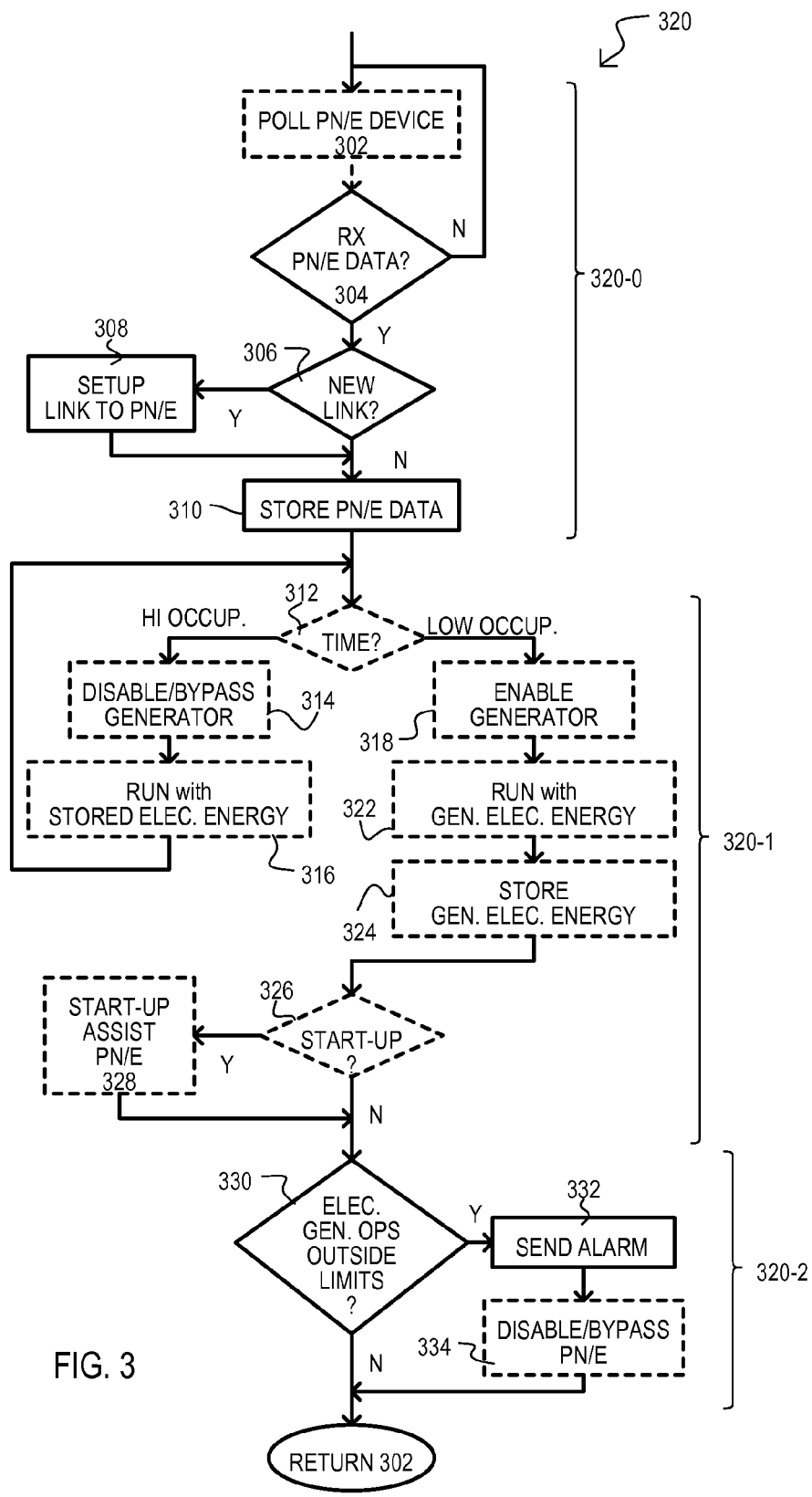
FIG. 3 is a flow diagram showing operations that may be performed by a system and/or pneumatic energy harvesting devices according to embodiments.

Referring now to FIG. 3, various operations executable by a control device (like that shown as 220 in FIG. 2) and/or some operations executable by PN/E harvesting devices (hereinafter PN/E devices) according to various embodiments shown herein, are depicted in a flow diagram 320. In the particular embodiment shown, operations may be conceptualized as falling into three categories: monitoring operations 320-0, control operations 320-1, and diagnosis operations 320-2.

Monitoring operations 320-0 may include receiving data from a PN/E device (box 304). Such an operation may include monitoring wired and/or wireless communication links with PN/E devices, and well as links considered available (i.e., not currently connected to a PN/E). Received data may be examined to see if the data is being received on an available link (box 306). If data is received on a new (i.e., available) link (Y from 306), a link may be set up (box 308). Such an action may include indexing a device ID of the PN/E device to a communication channel, and optionally, receiving configuration data for such a device that may be utilized in control operations 320-1 and/or diagnosis operations 320-2. Data received from PN/E device may be stored 310. Optionally, data from PN/Es may be polled (box 302). That is, a control device may transmit requests for data from PN/Es, and PN/Es may transmit such data in response.

Control operations 320-1 may be executed by a control device transmitting control commands to a PN/E device. Alternatively, as will be shown in embodiments below, control operations may be executed by a PN/E device itself. In the embodiment of FIG. 3, control operations 320-1 may include determining an operational time for a PN/E (box 312). Such a step may include comparing a current time to time limits corresponding to the PN/E device. According to such a comparison, an operation the PN/E device may be altered. In the very particular embodiment shown, such an action may include determining if the present time is a high occupancy time for a site at which a PN/E is deployed, or if such a time is a low occupancy time for the site.

If it is determined to be a high occupancy time (HI OCCUP. from 312), a generator on a PN/E device may be bypassed (e.g., a flow may be prevented entering a PN/E device) or a PN/E device may be otherwise disabled (box 314). Optionally, a PN/E may then run on stored electrical energy (box 316). Such actions may result in a lower noise operating environment during high occupancy times.

If it is determined to be a low occupancy time (LOW OCCUP. from 312), a generator on a PN/E device may be enabled (box 318). In particular embodiments, an enabled PN/E may run on generated electrical energy (as opposed to stored electrical energy) (box 322). Optionally, a PN/E device generator may also store generated electrical energy as well (box 324).

Optionally, control operations 320-1 may determine if a PN/E device is starting up (e.g., if a PN/E device was just enabled after having been disabled/bypassed) (box 326). If a start-up operation is determined (Y from 326), a PN/E device may be given a start-up assist (box 328). Start-up assist may include a PN/E device imparting initial energy, generated from a non-pneumatic source, to overcome inertia of mechanical elements within a PN/E device to induce an initial movement, and then subsequently allow a pneumatic system flow of pressurized gas to continue such movements. In particular embodiments, this may include a control device issuing a start-up command to a PN/E. In other embodiments, a PN/E may execute such an operation in a self-contained fashion. In the particular embodiment of FIG. 3, if a start-up operation is not determined (N from 326), operations may proceed to diagnosis operations 320-2.

Diagnosis operations 320-2 may include determining if electrical generation operations for a PN/E device are outside of one or more predetermined limits (box 330). Such an operation may determine when a PN/E and/or a pneumatic system are not functioning. Determinations may be made according to generator type. Examples of generator values that may be compared include, but are not limited to: pulse counts from a generator over a predetermined time period (pulse rate), pulse amplitude, power generated (e.g. root mean square), or a DC output from a rectifier. If generator operations are outside of limits, an alarm may be sent (box 332). Optionally, in response to an alarm condition, a PN/E device may be disabled or bypassed (box 334).

In this way, monitor operations, control operations, and diagnosis operations may be performed on, or by PN/E devices.

PN/E devices according to embodiments may be electrically powered in a number of different ways. Various embodiments describing possible power arrangements will now be described with reference to FIGS. 4 to 6.

Figure 4:
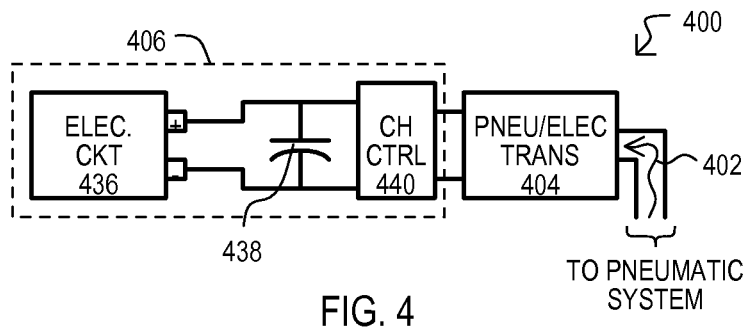
FIG. 4 is a block diagram of a pneumatic energy harvesting device according to another embodiment.

Referring to FIG. 4, another example of a PN/E device is shown in a block schematic diagram and designated by the general reference character 400. PN/E device 400 may include sections like those of FIG. 1. Accordingly, like sections are referred to by the same reference character, but with the first digit being a "4" instead of a "1". In very particular examples, a PN/E device 400 may be one example of that shown in FIG. 1.

FIG. 4 differs from FIG. 1 in that an electrical section 406 may include an electrical circuit 436, a storage capacitor 438, and a charge control circuit 440. An electrical circuit 436 may perform functions such as those noted in the embodiments shown herein, and equivalents, and may receive power from a storage capacitor 438. A storage capacitor 438 may be a "super" capacitor. A charge control circuit 440 may control how storage capacitor 438 is charged by electrical energy generated by PN/E transducer 404. A charge control circuit 440 may include any of: a variable load impedance, current limiter, or switches.

In this way, a PN/E device may charge a storage capacitor, which in turn, may power a corresponding electrical circuit of the PN/E device.

Figure 5:
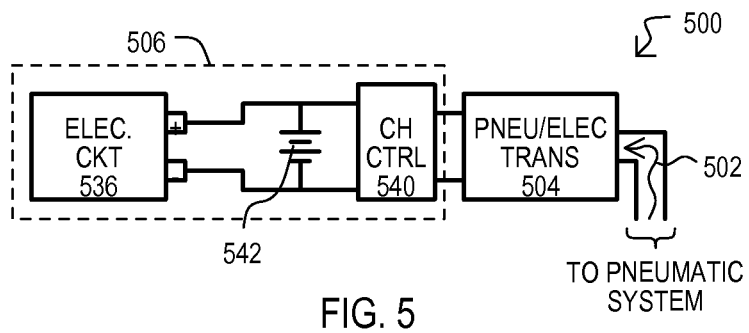
FIG. 5 is a block diagram of a pneumatic energy harvesting device according to a further embodiment.

Referring to FIG. 5, another example of a PN/E device is shown in a block schematic diagram and designated by the general reference character 500. PN/E device 500 may include sections like those of FIG. 1, and like sections are referred to by the same reference character, but with the first digit being a "5" instead of a "1". In very particular examples, a PN/E device 500 may be one example of that shown in FIG. 1.

FIG. 5 may have a configuration similar to that of FIG. 4. However, a PN/E 500 may have a battery 542 instead of a capacitor. In particular embodiments, a battery 542 may be a rechargeable battery that may be periodically recharged by PN/E transducer 504.

In this way, a PN/E device may charge a battery, which in turn, may power a corresponding electrical circuit of the PN/E device.

Figure 6:
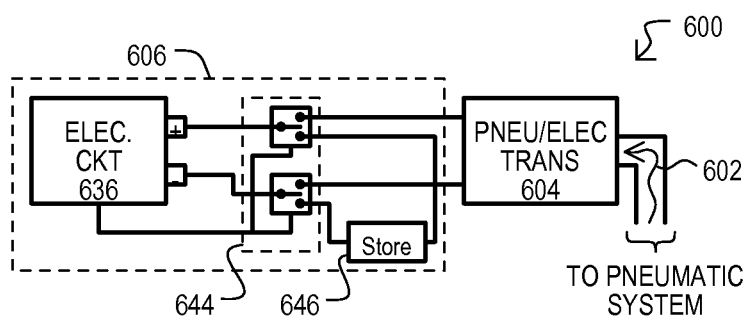
FIG. 6 is a block diagram of a pneumatic energy harvesting device according to yet another embodiment.

Referring to FIG. 6, another example of a PN/E device is shown in a block schematic diagram and designated by the general reference character 600. PN/E device 600 may also include sections like those of FIG. 1. Again, like sections are referred to by the same reference character, but with the first digit being a "6" instead of a "1". In very particular examples, a PN/E device 600 may be one example of that shown in FIG. 1.

In the embodiment of FIG. 6, a PN/E 600 may have an electrical section that includes an electrical circuit 636, a power supply switch 644, and an electrical storage device 646. A power supply switch 644 may operate to selectively connect electrical circuit 636 to PN/E transducer 604, or storage device 646. In the very particular embodiment shown, electrical circuit 636 may control a switching of power supply switch 644. A storage device 646 may be a battery or super capacitor, as but two examples.

In some embodiments, power supply switch 644 may selectively connect either PN/E transducer 604 or storage device 646 as a power source for electrical circuit 636. However, in other embodiments, power supply switch 644 may selectively connect, or disconnect PN/E transducer 604 to storage device 646. This may enable a periodic recharging of storage device.

In this way, a PN/E device may selective switch between receiving power from a PN/E transducer or a storage device.

As noted above, PN/E device embodiments may operate in conjunction with pneumatic devices that perform functions in response to a same flow of pressurized gas as that utilized to generate electrical power. In such embodiments, a flow of pressurized gas may be directed according to various modes of operations. Various embodiments showing flow directing arrangements will now be described with reference to FIGS. 7 to 9.

Figure 7:
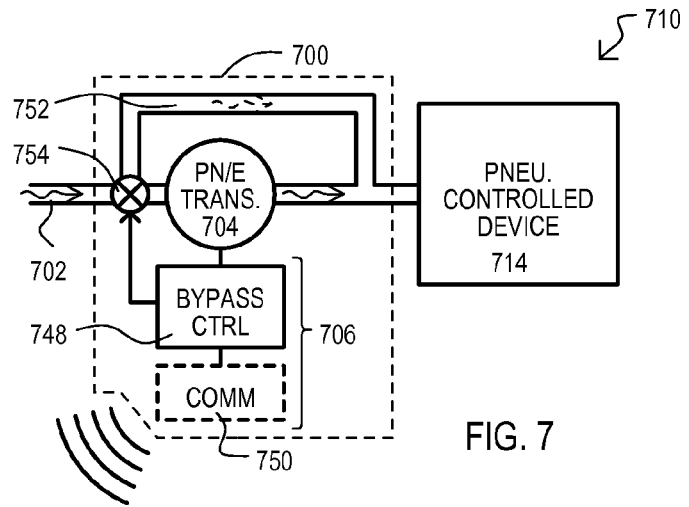
FIG. 7 is a block diagram of a pneumatic energy harvesting system according to an embodiment.

Referring to FIG. 7, an example of a system is shown in a block diagram and designated by the general reference character 710. System 710 may include a PN/E device 700 pneumatically connected to a pneumatic device 714. PN/E device 700 may include a PN/E transducer 704, electrical section 706, bypass path 752, and bypass valve 754. A PN/E transducer 704 may convert a flow of pressurized gas received from bypass valve 754 into electrical energy for electrical section 706.

In the particular embodiment shown, electrical section 706 may include a bypass control circuit 748 and, optionally, a communication circuit 750. A bypass control circuit 748 may provide a control signal to bypass valve 754. In response to such a signal, a bypass valve 754 may enable a flow of gas received at pneumatic system inlet 702 to be applied to either PN/E transducer 704 or to bypass path 752. A bypass control circuit 748 may contain its own configuration data for determining when/how bypass valve 754 should be controlled. In very particular embodiments, a bypass control circuit 748 may include a microcontroller integrated circuit that executes functions like those shown in FIG. 3, to thereby bypass or enable PN/E transducer 704.

A communication circuit 750 may transmit data, on a wired or wireless connection, indicating a status of PN/E transducer 704 and/or bypass valve 754. In alternate embodiments, communication circuit 750 may receive commands from a control device for controlling the operation of PN/E transducer 704 and/or bypass valve 754.

A pneumatic device 714 may operate in response to a pressurized gas flow received from PN/E transducer 704, or received from bypass path 752 by operation of bypass valve 754.

Figure 8:
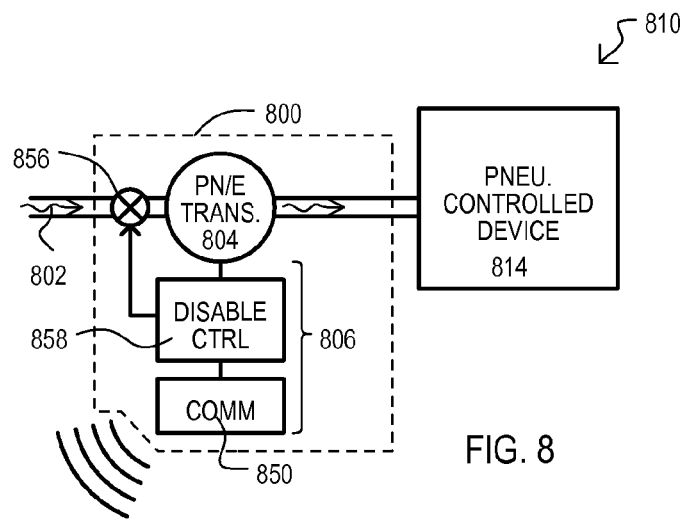
FIG. 8 is a block diagram of a pneumatic energy harvesting system according to a further embodiment.
Figure 9:
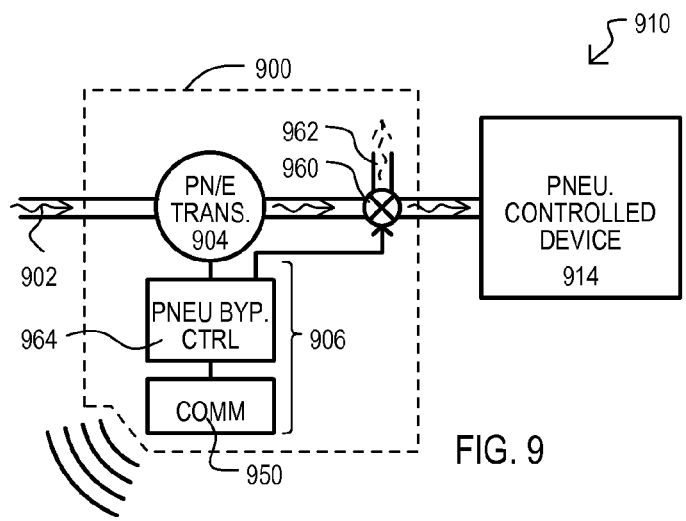
FIG. 9 is a block diagram of a pneumatic energy harvesting system according to yet another embodiment.

It is noted that FIGS. 7 to 9 show systems in which a pneumatic device is downstream from a PN/E device, other embodiments may include arrangements in which a PN/E device is downstream from a PN/E device.

In this way, a pressurized gas flow may bypass a PN/E device to be applied to a corresponding pneumatic device, or flow through a PN/E device to the corresponding pneumatic device.

Referring to FIG. 8, another example of a system is shown in a block schematic diagram and designated by the general reference character 800. System 800 may include sections like those of FIG. 7. Such like sections are referred to by the same reference character, but with the first digit being an "8" instead of a "7".

FIG. 8 may differ from FIG. 7 in that it may include a disable valve 856 instead of a bypass valve 754. Further, electrical section 806 may include a disable control circuit 858 instead of a bypass control circuit 748. A disable control circuit 858 may provide a control signal to disable valve 856. In response to such a signal, a disable valve 754 may prevent a flow of gas received at pneumatic system inlet 802 from being applied to either PN/E transducer 704 or pneumatic device 814. Like the embodiment of FIG. 7, a disable control circuit 858 may contain its own configuration data for determining when/how disable valve 856 should be controlled, and in particular embodiments may be a microcontroller that executes functions like those shown in FIG. 3. In addition or alternatively, disable circuit 858 may be controlled according commands received by communication circuit 850.

In this way, a pressurized gas flow may be selectively prevented from being applied to a PN/E device and corresponding pneumatic device.

Referring to FIG. 9, another example of a system is shown in a block schematic diagram and designated by the general reference character 900. System 900 may include sections like those of FIG. 7. Such like sections are referred to by the same reference character, but with the first digit being a "9" instead of a "7".

FIG. 9 may differ from FIG. 7 in that it may include a pneumatic device bypass valve 960 between PN/E transducer 904 and pneumatic device 914. In addition, an electrical section 906 may include a pneumatic bypass control circuit 964 instead of a bypass control circuit 749. A pneumatic disable control circuit 964 may provide a control signal to pneumatic bypass valve 960. In response to such a signal, a pneumatic bypass valve 960 may allow a flow of gas output from PN/E transducer 904 to be applied to pneumatic device 914, or alternatively, to be output on output on vent 962. As in the embodiment of FIGS. 7 and 8, a pneumatic disable control circuit 964 may contain its own configuration data for determining when/how bypass valve 964 should be controlled, and in particular embodiments may be a microcontroller that executes functions like those shown in FIG. 3. In addition or alternatively, pneumatic disable control circuit 964 may be controlled according commands received by communication circuit 890.

In this way, a pressurized gas flow that flows through a PN/E device may be applied to a pneumatic device, or vented, preventing the flow from being applied to the pneumatic device.

Having described various PN/E devices and systems, examples of PN/E transducers that may be included in the embodiments will now be described.

Particular embodiments may include "turbine" type PN/E transducers that may produce a rotational motion in response to a flow of pressurized gas, and utilize such motion in an electro-magnetic generator to produce electrical power. Very particular turbine embodiments will now be described with reference to FIGS. 10 to 13C.

Figure 10:
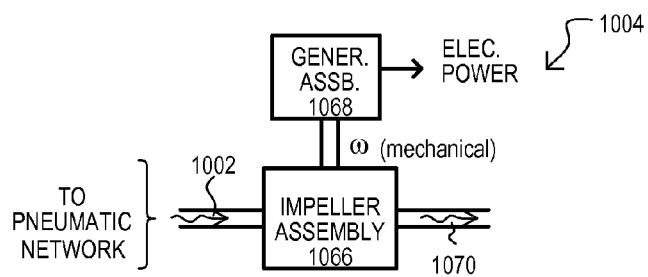
FIG. 10 is a block diagram showing a turbine based pneumatic-to-electrical (PN/E) transducer according to an embodiment.

Referring to FIG. 10, a PN/E transducer is shown in a block diagram and designated by the general reference character 1004. A PN/E transducer 1004 may include a pneumatic system inlet 1002, an impeller assembly 1066, and a generator assembly 1068. A pneumatic system inlet 1002 may receive pressurized gas from a larger pneumatic system (not shown). An impeller assembly 1066 may receive a flow of pressurized gas from pneumatic system inlet 1002, and rotate in response to such a flow, with any remaining flow being output from an exhaust 1070. In very particular embodiments, an impeller assembly 1006 may include blade structures for catching a gas flow and thereby inducing rotating mechanical motion.

Rotating mechanical motion (w) may be applied to generator assembly 1068. Generator assembly 1068 may translate mechanical motion (w) into electrical energy. In very particular embodiments, generator assembly 1068 may be an electro-magnetic assembly having a stationary stator and rotating rotor.

In this way, a PN/E transducer may be turbine based with an impeller assembly and a generator assembly.

Figure 11:
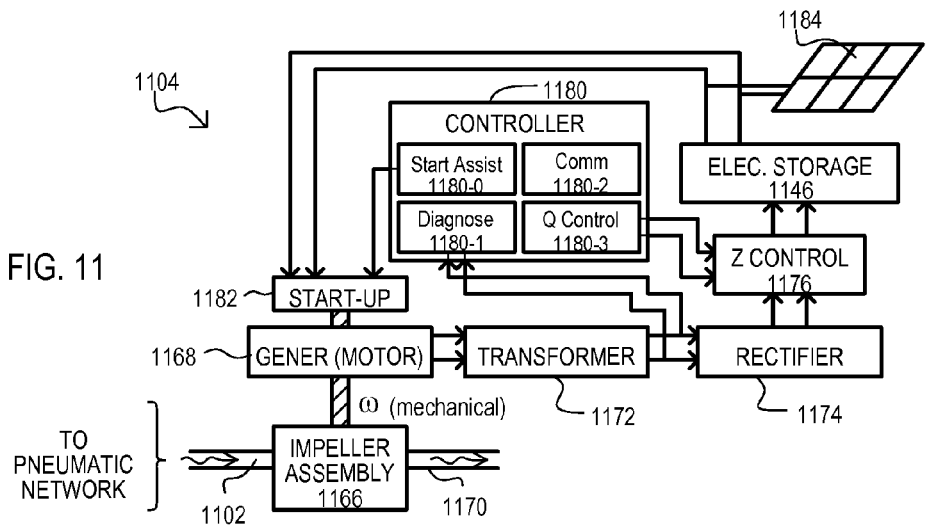
FIG. 11 is a block diagram showing a turbine based PN/E transducer according to another embodiment.

Referring to FIG. 11, a turbine type PN/E transducer according to another embodiment is shown in a block diagram and designated by the general reference character 1104. A PN/E transducer 1104 may include some of the sections shown in FIG. 10, accordingly, like sections are referred to by the same reference character but with the first two digits being "11" instead of "10". In one particular arrangement, a PN/E transducer 1100 of FIG. 11 may be one example of that shown in FIG. 10.

FIG. 11 may differ from that of FIG. 10 in that it shows a transformer 1172, rectifier 1174, variable load circuit 1176, electrical storage device 1146, controller 1180, and start-up assist section 1182.

A transformer 1172 may transform voltage pulses output from generator 1168 prior to applying them to rectifier 1174. Rectifier 1174 may rectify pulses from transformer 1172 to generate a DC charge current. A variable load circuit 1176 may be capable of altering a load presented to rectifier 1174 in response to values from controller 1180, to thereby optimize a charging of electrical storage device 1146. In one very particular embodiment, a generator 1168 may be a brushless DC motor that generates output pulses from stator coils, a transformer 1172 may be a 1:20 step-up transformer, and a rectifier 1174 may be a low voltage rectifier. An electrical storage device 1146 may be a super capacitor, or alternatively, a rechargeable battery.

A controller 1180 may control operations of a PN/E transducer 1104. In the particular embodiment of FIG. 11, such operations may include start assist operations 1180-0, diagnosis operations 1180-1, communication operations 1180-2 and charge control operations 1180-3, to name but a few. In a very particular embodiment, a controller 1180 may include a microcontroller integrated circuit device, programmed to execute such operations.

A start assist operation 1180-0 may overcome the inertia of impeller assembly 1166 (and any mechanical load presented by generator 1168), in the event an input flow on pneumatic system inlet 1102 is not sufficient to start rotation. In the particular embodiment of FIG. 11, controller 1180 may output activation signals to start assist section 1182, which may provide mechanical force to cause an initial rotation within impeller assembly 1166. In a very particular embodiment, a start assist section 1182 may apply initial electrical power to generator assembly 1068 (which may operate as an electrical motor) to cause such rotation. Power for this start assist operation may be supplied by electrical storage device 1146. In addition or alternatively, such power may be provided from an alternative source, such as a solar power generator 1184.

A diagnosis function 1180-1 may include operations like those shown as 320-2 in FIG. 3. In particular examples, a controller 1180 may store limit values in memory circuits, and include arithmetic/logic circuits to compare such values against values received from components of PN/E transducer 1104. In one embodiment of FIG. 11, a diagnosis function 1180-1 may include a counter circuit that counts pulses output from transformer 1172 in a predetermined time period, to thereby establish a rotational rate of impeller assembly 1166. Such a value may be utilized to determine a loss of pressurization at pneumatic system inlet 1102, which may indicate power loss at a site containing a corresponding to a pneumatic system connected at inlet 1102. If a count value falls below a limit, an alarm may be issued via a communication function 1180-2.

In some embodiments, an impeller rotation count value/rate, may also allow for automatic calibration of a PN/E transducer to compensate for higher or lower pressure.

In some embodiments, count values may be provided to a charge control function 1180-3 to alter charging operations based on such a count.

Still further, in some embodiments, an impeller rotation count value/rate may diagnose when an impeller is not operating properly.

A communication function 1180-2 may transmit alarms, or collected data values from PN/E transducer 1104 to a remote point, such as a control device. Such a communication may be via a wired and/or wireless communication link via a communication circuit within controller 1180.

A charge control function 1180-3 may output control signals to vary a load of variable load circuit 1176. In particular embodiments, a charge control function 1180-3 may include a controller 1180 outputting control signals in response to input values from sections of PN/E transducer 1104, including but not limited to electrical storage device 1146 and/or transformer 1172. Such values may optimize a charge operation for electrical storage device 1146. In a very particular embodiment, an effective load may be varied to provide as much energy to an electrical storage device 1146 without dropping a voltage beyond a predetermined limit or causing too much back electromotive force to slow down the impeller assembly 1166 to the point where it loses efficiency or is at risk of stopping entirely.

In this way, a PN/E transducer may include a controller for executing any of start-up operations, diagnosis operations, communication operations, and charge control operations.

Figure 12A:
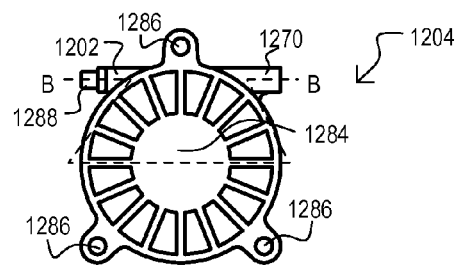
FIGS. 12A and 12B are a side plan view and a cross sectional view showing turbine based PN/E transducers according to additional embodiments.
Figure 12B:
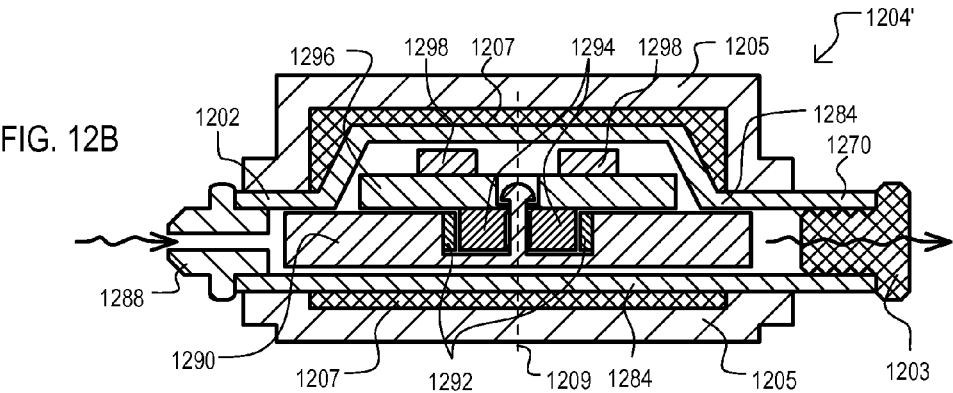

Referring to FIGS. 12A and 12B, PN/E transducers according to still other embodiments are shown in a plan view and a compound cross sectional view.

Referring to FIG. 12A, a PN/E transducer 1204 may include an enclosure 1284 in which may be housed various components, including an impeller assembly, generator, transformer, rectifier, charge control, electrical storage device, controller, and/or start-up section, as shown in FIG. 11, or an equivalent. An enclosure 1284 may have a tight tolerance with respect to a rotating part of an included impeller assembly, thereby increasing surface area of impeller blades contacted by a pressurized gas received at a pneumatic system inlet 1202. Either or both of an inlet 1202 and an exhaust 1270 may be integral parts of an enclosure 1284. An enclosure 1284 may also include mechanical mounting structures 1286 that enable PN/E transducer 1204 to be attached at a pneumatic system access point (e.g., on or within a wall, floor, ceiling, etc.).

A PN/E transducer 1204 may also include a constrictor nozzle 1288. A constrictor nozzle 1288 may constrict a flow inlet, to thereby provide a higher velocity for the pressurized gas at it is applied to an impeller assembly.

Referring to FIG. 12B, a PN/E transducer 1204' according to a further embodiment is shown in a compound cross sectional view, which may be conceptualized as corresponding to line B-B of FIG. 12A. However, FIG. 12B includes additional features not shown in FIG. 12A.

PN/E transducer 1204' includes enclosure 1284 which may contain an impeller structure 1290 and a circuit board 1296. In response to a pressurized gas at pneumatic system inlet 1202 (via constrictor nozzle 1288), impeller structure 1290 may rotate about rotational axis 1209. Impeller structure 1290 may include rotors 1292 that may rotate about stator 1294 to generate electrical pulses. A circuit board 1296 may be electrically connected to stator 1294 to receive generated electrical pulses and may include circuitry 1298 mounted thereon. Circuitry 1298 may include a transformer, rectifier, charge control circuit, electrical storage device, controller, and/or start-up section, as shown in FIG. 11, or an equivalent.

Unlike FIG. 12A, PN/E transducer 1204' of FIG. 12B may include an exhaust sound filter 1203 and a secondary enclosure 1205. An exhaust sound filter 1203 may be formed in an exhaust 1270, and dampen sound generated by components within enclosure 1284 that would otherwise emanate from exhaust 1270. A secondary enclosure 1205 may cover all or a portion of enclosure 1284 to provide further reductions in sound generated from within enclosure 1284. Optionally, a PN/E transducer 1204' may include a sound dampening material 1207 formed between enclosure 1284 and secondary enclosure 1205.

In very particular embodiments of FIGS. 12A to 12B, a PN/E transducer 1204/1204' may operate in response to flow rates within a range of about 0.6 liters per minute (LPM) to about 0.1 LPM, generated by a nozzle 1288 receiving air at a pressure having a lower limit of about 15 pounds per square inch (PSI), preferably about 20 PSI. In response to such gas flow rates, a PN/E transducer may generate electric power in the range of about 200 µW to 600 µW, or more.

In this way, a PN/E device may include constrictor nozzles for increasing a velocity of an inlet pressurized gas, as well as one or more enclosures for directing such gas at an impeller structures. Sound generated by rotational elements may be reduced by such an enclosure, by an exhaust sound filter and/or by a secondary enclosure.

Turbine based PN/E embodiments above have shown electrical start assist configurations, whereby electrical power may initiate turbine motion. However, alternate embodiments may include mechanical start assist arrangements. Particular such embodiments will now be described with reference to FIGS. 13A to 15.

Figure 13A:
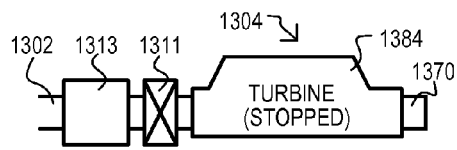
FIGS. 13A to 13D are block diagrams showing a start assist structure that may be included in embodiments.

Referring to FIGS. 13A to 13D, a ballast start assist embodiment of a PN/E transducer is shown in a block diagram and designated by the general reference character 1304. A PN/E transducer 1304 may include an enclosure 1384 that may house turbine components, a ballast structure 1313, and an inlet pressure valve 1311. A PN/E transducer 1304 may receive an inlet flow of gas at pneumatic system inlet 1302 and output a remaining flow at exhaust 1370. In FIG. 13A, it is assumed that pressure at inlet 1302 is below a predetermined threshold. Consequently, pressure valve 1311 is closed, and ballast structure 1313 has a reduced shape.

Figure 13B:
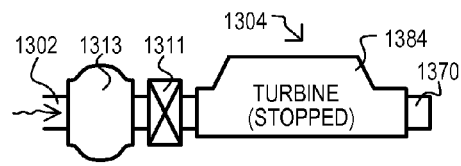

Referring to FIG. 13B, in response to a pressurized gas at inlet 1302, a ballast structure 1313 may expand, increasing a pressure at inlet pressure valve 1311. However, in FIG. 13B it is assumed that such an accumulated pressure may not be sufficient to open pressure valve 1311.

Figure 13C:
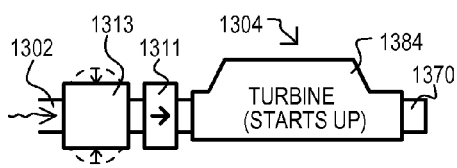

Referring to FIG. 13C, in response to a pressurized gas in ballast structure 1313, inlet pressure valve 1311 may open, and ballast structure may return to a reduced shape. Consequently, a turbine structure within enclosure 1384 may receive a burst of higher flow gas, which may initiate rotation of the turbine structures.

Figure 13D:
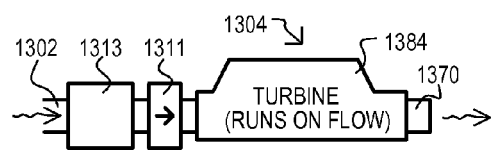

Referring to FIG. 13D, inlet pressure valve 1311 may remain open, and a turbine structure within enclosure 1384 may continue to rotate in response to a standard flow received at inlet 1302.

In this way, a PN/E transducer may include a ballast structure for providing start assist power to a turbine structure.

Figure 14A:
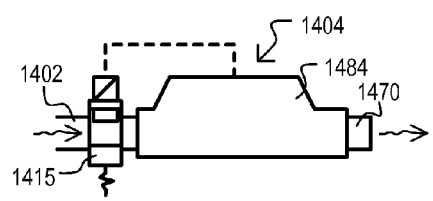
FIGS. 14A and 14B are block diagrams showing another start assist structure that may be included in embodiments.
Figure 14B:
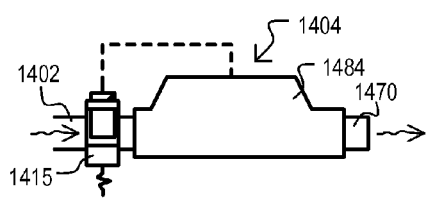

Referring to FIGS. 14A to 14B a solenoid valve controlled PN/E transducer is shown in a block diagram and designated by the general reference character 1404. A PN/E transducer 1404 may include an enclosure 1484 that may house turbine components, as well as a solenoid valve 1415.

In response to control signals, a solenoid valve 1415 may be operated to control the amount of pressurized gas allowed to pass from pneumatic system inlet 1402 to turbine components within enclosure 1484. In the very particular embodiment of FIG. 14, a solenoid valve 1415 may be controlled by a controller or similar device within enclosure 1484.

In one embodiment, a solenoid valve 1415 may initially constrict (or completely close), allowing inlet pressure to build, and then subsequently open wider to allow an initial burst of gas to start assist an impeller assembly. In other embodiments, a solenoid valve 1415 may moderate a flow to ensure a turbine assembly turns within a predetermined rate range.

In this way, a PN/E transducer may include a variable valve for controlling flow into the PN/E transducer.

Figure 15:
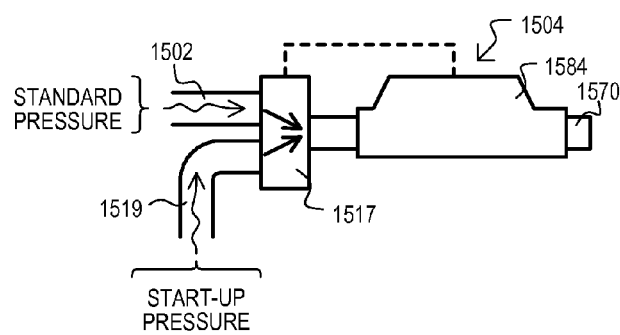
FIG. 15 is a block diagrams showing a further start assist structure that may be included in embodiments.

Referring to FIG. 15, a dual gas source PN/E transducer is shown in a block diagram and designated by the general reference character 1504. A PN/E transducer 1504 may include an enclosure 1584 that may house turbine components, as well as a multi-input valve 1517.

In response to control signals, a multi-input valve 1517 may select between different pressurized gas sources as inputs to enclosure 1584. The particular embodiment of FIG. 15 shows a multi-input valve 1517 having a first input connected to a pneumatic system inlet 1502 and a second input connected to a start-up pressure source 1519. In one embodiment, a multi-input valve 1517 may initially apply pressurized gas from a start-up pressure source 1519 which may provide at least an initial, higher flow rate or pressure than that from pneumatic system inlet 1502. Once turbine elements within enclosure 1584 start to turn, a multi-input valve 1517 may switch to pneumatic system inlet 1502.

In this way, a PN/E transducer may select between two different gas inlets to start assist a turbine element.

While a PN/E transducer may be a turbine based or turbine-like, other embodiments may generate electrical energy with a "ballast" system that periodically drives elements of an electro-magnetic system with bursts of pressurized gas. Particular ballast type PN/E transducers according to embodiments will now be described with reference to FIGS. 16A to 18B.

Referring to FIGS. 16A to 16D, a ballast type PN/E transducer is shown in a partial cross sectional view and designated by the general reference character 1604. A PN/E transducer 1604 may include a generator chamber 1621, a magnet 1623, an electrical coil 1625 and a supply control 1629. A generator chamber 1621 may contain magnet 1623 and include a vent 1627. Electrical coil 1625 may be wrapped around an outside of generator chamber 1621 and surround a travel path of magnet 1623 within generator chamber 1621. In one embodiment, a magnet 1623 may be sleeved with a material that allows a very low friction movement within walls of the generator chamber 1621. In a very particular embodiment, such a sleeve may be synthetic polymer, such as Teflon® by DuPont.

A supply control 1629 may receive pressurized gas at a pneumatic system inlet 1602. Supply control 1629 may generate periodic bursts of gas at a chamber input 1631 of generator chamber 1621.

Figure 16A:
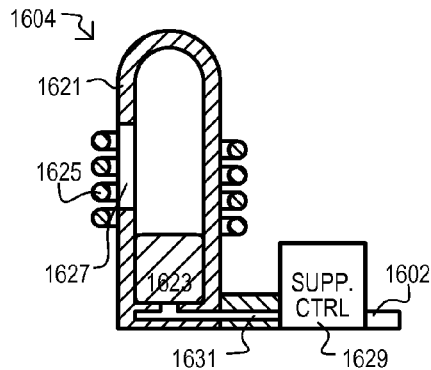
FIGS. 16A to 16D are partial cross sectional views showing a ballast based PN/E transducer according to an embodiment.

Referring now to FIG. 16A, in a power generation operation, a magnet 1623 may rest at a bottom of generation chamber. Supply control 1629 may start accumulating gas.

Figure 16B:
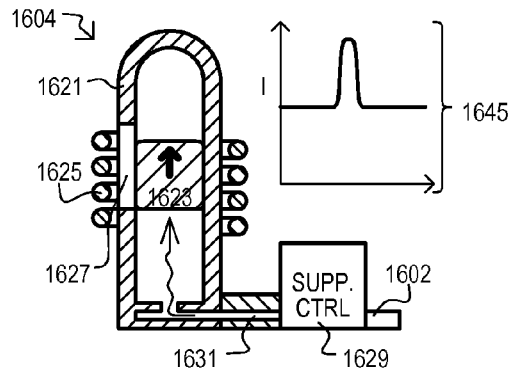

Referring now to FIG. 16B, supply control 1629 may issue a burst of pressurized gas at chamber input 1631. Magnet 1623 may be positioned between vent 1627 and chamber input 1631. Consequently, the burst of gas may cause magnet 1623 to start to move through electrical coil 1625. Such movement may generate a current pulse within electrical coil 1625, as represented by graph 1645.

Figure 16C:
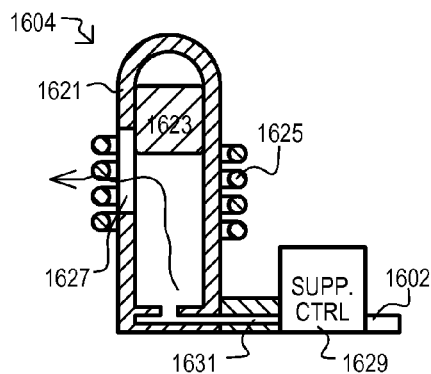

Referring now to FIG. 16C, as magnet 1623 moves above vent 1627, pressurized gas may escape, resulting in a drop of pressure below magnet 1623. Inertia of magnet 1623 may continue carrying magnet to a top of a chamber 1621, to complete the current pulse shown in FIG. 16B.

Figure 16D:
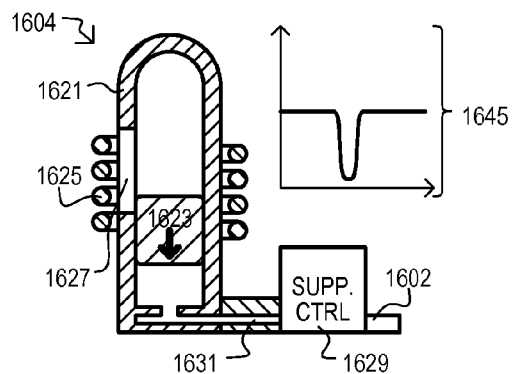

Referring now to FIG. 16D, with pressurized gas vented out of vent 1647, gravity may force magnet 1623 downward back through electrical coil 1625. Such movement may result in a generated a current pulse within electrical coil 1625, as represented by graph 1645.

A PN/E transducer 1604 may include any or all of the circuitry shown in FIG. 11, including but not limited to a transformer, rectifier, charge control, electrical storage device, controller and/or solar power generator.

In this way, a PN/E transducer may include a ballast chamber structure that drives a magnet between coils with a burst of pressurized gas and gravity.

Figure 17A:
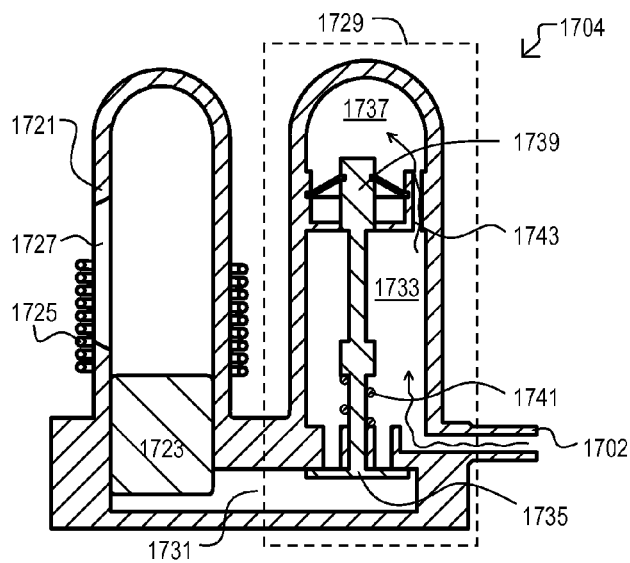
FIGS. 17A to 17C are side cross sectional views showing a ballast based PN/E transducer according to another embodiment.
Figure 17B:
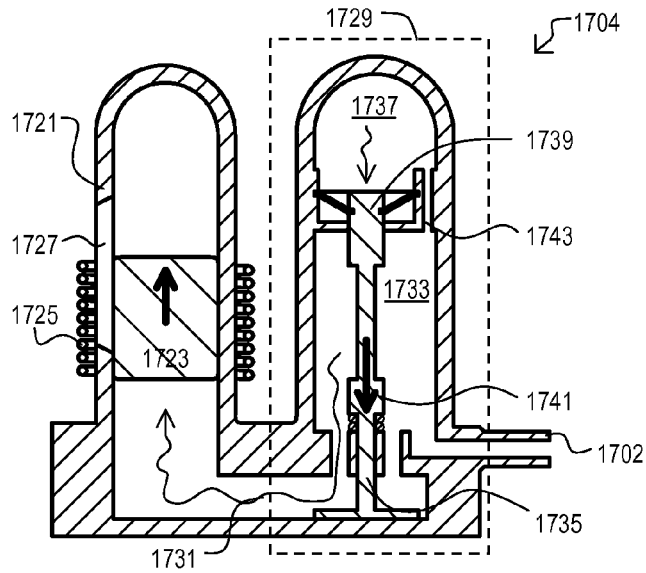
Figure 17C:
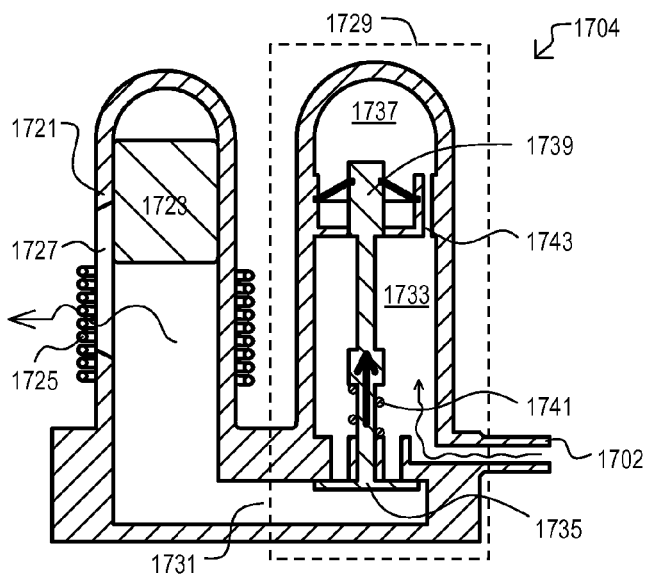

Referring now to FIGS. 17A to 17C, a ballast type PN/E transducer according to another embodiment is shown in a side cross sectional view and designated by the general reference character 1704. A PN/E transducer 1704 may include some of the same items as FIGS. 16A to 16D, accordingly, like items are referred to by the same reference character but with the first digits being "17" instead of "16".

In the particular embodiment of FIGS. 17A to 17C, a supply control 1729 may include a ballast chamber 1733, a relief valve 1735, a relief valve assist chamber 1737, a relief valve assist structure 1739, a relief valve spring 1741, and an assist chamber flow path 1743. A ballast chamber 1733 may house relief valve 1735, including relief valve spring 1741, and may be connected to generator chamber 1721 at chamber input 1731.

A relief valve 1735 may be a mechanical pressure type valve that opens in response to pressurized gas in ballast chamber 1733. Such a valve may be closed in response to relief valve spring 1741.

Relief valve assist structure 1739 may help to keep relief valve 1735 open by pressure accumulated in relief valve assist chamber 1737. A relief valve assist structure 1739 may include a diaphragm structure that may apply force to relief valve 1735 in a downward direction in response to pressure in relief valve assist chamber 1737. An assist chamber flow path 1743 may provide a gas flow path between relief valve assist chamber 1737 and ballast chamber 1733.

Having described sections of PN/E transducer 1704, particular operations of the transducer will now be described.

Referring to now to FIG. 17A, in a power generation operation, a magnet 1723 may rest at a bottom of generation chamber. Pressurized gas may be received from pneumatic system inlet 1702. Because relief valve 1735 is in a closed position, ballast chamber 1735 may be pressurized. As ballast chamber 1735 pressurizes, relief valve assist chamber 1737 may likewise be pressurized through assist chamber flow path 1743.

Referring now to FIG. 17B, due to accumulated pressure in ballast chamber 1733, relief valve 1735 may open, forcing pressurized gas into generator chamber 1721 through chamber input 1731. Such gas may cause magnet 1723 to move through electrical coil 1725 to generate a current pulse within electrical coil 1725. Due to the sizing of assist chamber flow path 1743, pressure may remain within relief valve assist chamber 1737 and maintain relief valve 1735 in the open position for a predetermined time period.

Referring now to FIG. 17C, as magnet 1723 moves upward, pressurized gas may escape through vent 1727, resulting in a drop of pressure within generator chamber 1721. In addition, due to leakage from relief valve assist chamber 1737 through assist chamber flow path 1743, a relief valve spring 1741 may force relief valve 1735 back to the closed position.

In a similar fashion to FIGS. 16A to 16D, with pressurized gas vented from generator chamber 1721, gravity may force magnet 1723 downward back through electrical coil 1725 to generate another oppositely polarized current pulse within electrical coil 1725.

A PN/E transducer 1704 may include any or all of the circuitry shown in FIG. 11, including but not limited to a transformer, rectifier, charge control, electrical storage device, controller and/or solar power generator.

In this way, a PN/E may include a ballast chamber with a relief valve for applying a burst of pressurized gas that moves a magnet through a coil in a generator chamber.

Figure 18A:
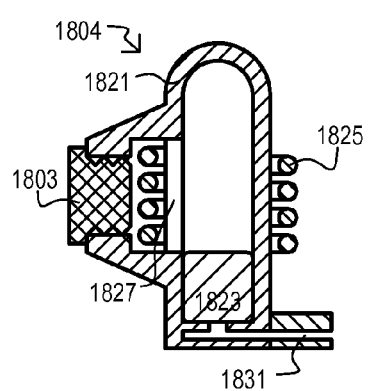
FIGS. 18A and 18B are side cross sectional views showing ballast based PN/E transducers according to still other embodiments.
Figure 18B:
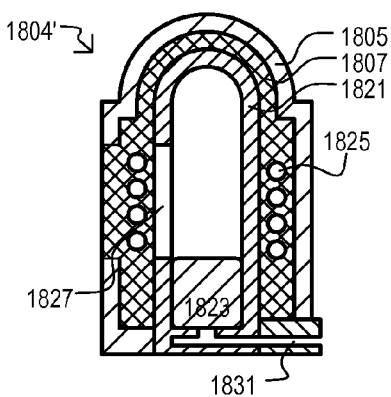

Referring to FIGS. 18A and 18B, ballast type PN/E transducers are shown in two cross sectional views. FIGS. 18A and 18B show PN/E transducers like those of FIGS. 16A to 16B, and like items are shown by the same reference characters but with the first two digits being "18" instead of "16".

Referring to FIG. 18A, a PN/E transducer 1804 may include an exhaust sound filter 1803 formed over vent 1827 that may reduce sound generated by movement within generator chamber 1821.

Referring to FIG. 18B, a PN/E transducer 1804 may include a secondary enclosure 1805 that surrounds generator chamber 1821 to reduce sound generated by movement within generator chamber 1821. Optionally, a sound dampening material 1807 may be formed between generator chamber 1821 and secondary enclosure 1805, including over vent 1827.

In this way, a PN/E transducer may include a generator chamber that includes a magnet that moves through a coil by bursts of pressurized gas.

While a PN/E transducer may be turbine based or ballast based, still other embodiments may be diaphragm based. In a diaphragm based PN/E transducer, gas pressure may force a diaphragm to expand, and when such gas pressure is relieved, the diaphragm may contract. An expansion and contraction of the diaphragm may force a magnet to move back and forth through or past an electrical coil.

Figure 19:
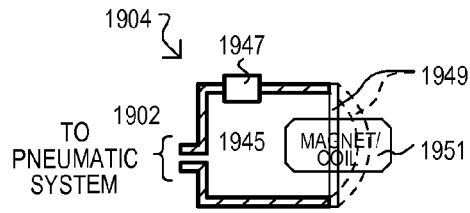
FIG. 19 is a block diagram showing a diaphragm based PN/E transducer according to an embodiment.

Referring to FIG. 19, a diaphragm PN/E transducer according to one embodiment is shown in a block diagram view and designated by the general reference character 1904. A PN/E transducer 1904 may include an inflation chamber 1945, a diaphragm 1949, a magnet/coil assembly 1951, and a relief valve assembly 1947.

An inflation chamber 1945 may receive a flow of pressurized gas from pneumatic system inlet 1902. In response to such a flow, diaphragm 1949 may displace, moving a magnet within a coil to generate a pulse. After being displaced, relief valve assembly 1947 may vent inflation chamber 1945, and diaphragm 1949 may return to its original shape, moving magnet in the opposite direction through the coil, and hence generating an oppositely polarized pulse.

In this way, a PN/E transducer may include a diaphragm that drives a magnet through a coil in response to a pressurized gas.

Figure 20A:
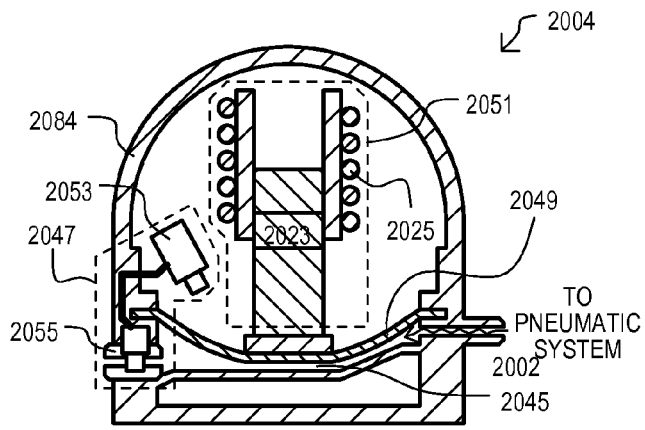
FIGS. 20A to 20C are side cross sectional views showing a diaphragm based PN/E transducer according to another embodiment.
Figure 20B:
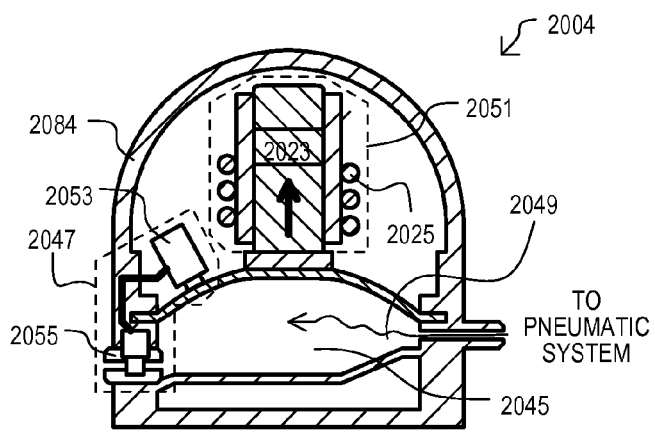
Figure 20C:
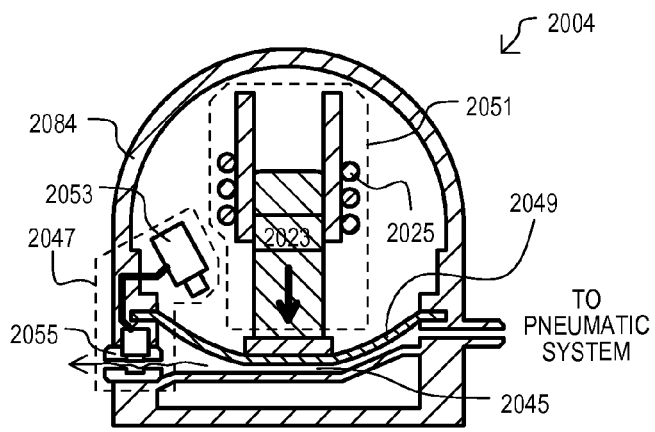

Referring now to FIGS. 20A to 20C, a diaphragm type PN/E transducer according to another embodiment is shown in side cross sectional views, and designated by the general reference character 2004.

A PN/E transducer 2004 may include like items as those shown in FIG. 19, accordingly, such items are shown by the same reference character but with the first digits being "20" instead of "19".

A PN/E transducer 2004 may include a magnet/coil assembly 2051 having a magnet 2023 and an electrical coil 2025 which may be situated within an enclosure 2084. A relief valve assembly 2047 may include a switch 2053 and a relief valve 2055.

Referring to now to FIG. 20A, in a power generation operation, a diaphragm 2049 may have an initial shape/position that results in magnet 2023 being a first position with respect to electrical coil 2025. Switch 2053 may have a position that results in relief valve 2055 being closed.

Referring now to FIG. 20B, due to an incoming flow of gas, diaphragm 2049 may expand, forcing magnet 2023 through electrical coil 2025 to generate a current pulse within electrical coil 2025. When diaphragm 2049 expands to a certain amount, switch 2053 may be activated. In response to switch 2053 being activated, relief valve 2055 may open, allowing pressurized gas within inflation chamber 2045 to be vented by operation of relief valve 2055.

Referring now to FIG. 20C, with relief valve 2055 open, diaphragm 2049 may return to an original shape, resulting in magnet 2023 being drawn back through electric coil 2025, and generating another opposite polarity current pulse.

A PN/E transducer 2004 may include any or all of the circuitry shown in FIG. 11, including but not limited to a transformer, rectifier, charge control, electrical storage device, controller and/or solar power generator.

In this way, a PN/E transducer may include a diaphragm that may trigger a venting relief valve. In other embodiments, a relief valve may be self actuating in response to a predetermined pressure.

While a PN/E transducer may be turbine based, ballast based, or diaphragm based, other embodiments may include PN/E transducers based on the operation of a pneumatic piston. Particular such embodiments will now be described with reference to FIGS. 21 to 24B.

Figure 21:
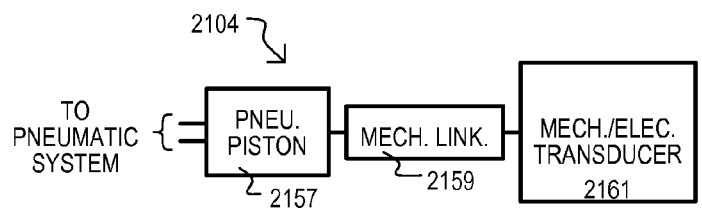
FIG. 21 is a block diagram of a pneumatic piston based PN/E transducer according to an embodiment.

Referring to FIG. 21, a pneumatic piston based PN/E transducer is shown in a block diagram and designated by the general reference character 2104. A PN/E transducer 2104 may include a pneumatic piston assembly 2157, optionally a mechanical linkage 2159, and a mechanical/electrical transducer 2161.

A pneumatic piston assembly 2157 may include a piston that makes a linear motion in response to a flow of compressed gas. A mechanical/electrical transducer 2161 may translate motion of the pneumatic piston assembly 2157 into electrical energy, either directly, or by way of a mechanical linkage.

In this way, a PN/E transducer may include a pneumatic piston.

Referring now to FIGS. 22A to 22D, one example of a pneumatic piston assembly that may be included in an embodiment like that of FIG. 21 is shown in a side cross sectional view, and designated by the general reference character 2257. A pneumatic piston assembly 2257 may include a pneumatic system inlet 2202, first and second valves 2263 and 2265, a piston 2267, a piston chamber 2269, and exhaust paths 2207.

Figure 22A:
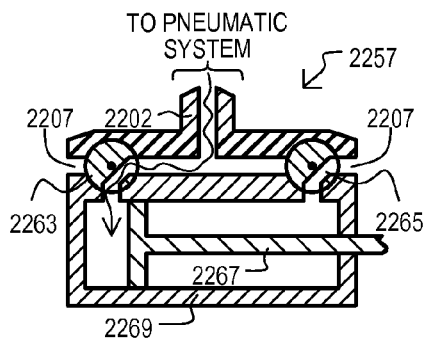
FIGS. 22A to 22D are side cross sectional views showing a dual action pneumatic piston assembly that may be included in embodiments.

Referring to FIG. 22A, by operation of first valve 2263, a pressurized gas may be provided from pneumatic supply inlet 2202 into piston chamber 2269 on a first side of piston 2267. Second valve 2265 may vent the section of piston chamber 2269 on a second side of piston through exhaust 2207.

Figure 22B:
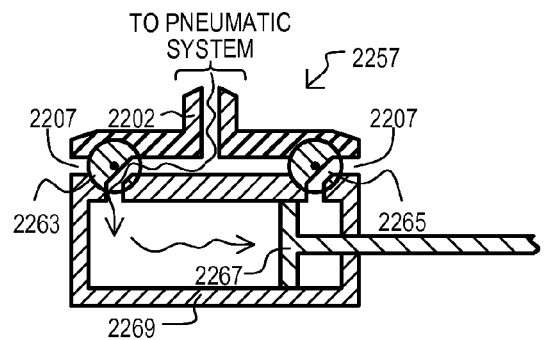

Referring to FIG. 22B, in response to the pressurized gas, piston 2267 may complete a first type stroke (to the right).

Figure 22C:
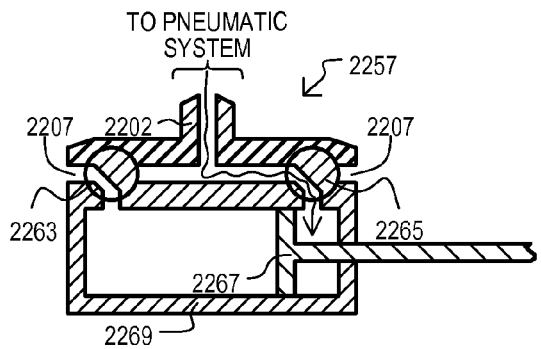

Referring to FIG. 22C, by operation of second valve 2265, a pressurized gas may be provided from pneumatic supply inlet 2202 into piston chamber 2269 on a second side of piston 2267. First valve piston 2263 may vent the portion of piston chamber 2269 on the opposing side of piston 2267 through exhaust 2207.

Figure 22D:
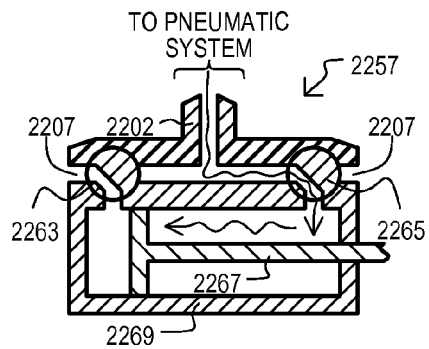

Referring to FIG. 22D, in response to the pressurized gas, piston 2267 may complete a second type stroke (to the left).

In this way, a dual action pneumatic piston may be included in a PN/E transducer.

Figure 23A:
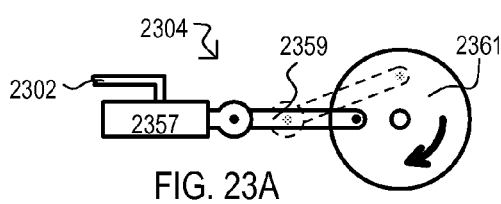
FIGS. 23A and 23B are block diagrams showing a pneumatic piston PN/E transducer according to another embodiment.
Figure 23B:
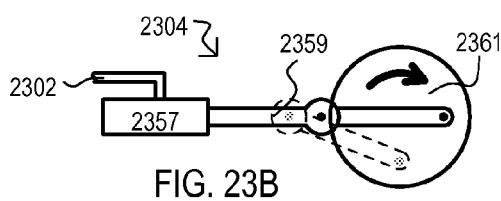

Referring now to FIGS. 23A and 23B, a pneumatic piston type PN/E transducer 2304 is shown in a block diagram. PN/E transducer may include a dual action piston assembly 2357 that may receive a pressurized gas supply at pneumatic system inlet 2302. A back and forth linear movement of dual action piston 2357 may drive pivot linkage 2359. Pivot linkage 2359 may impart rotational movement to generator 2361, which may generate electrical energy.

Figure 24A:
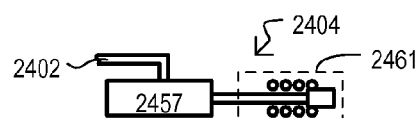
FIGS. 24A and 24B are block diagrams showing a pneumatic piston PN/E transducer according to a further embodiment.
Figure 24B:
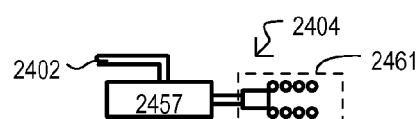

Referring now to FIGS. 24A and 24B, another pneumatic piston type PN/E transducer 2404 is shown in a block diagram. PN/E transducer may include a dual action piston assembly 2457 that may receive a pressurized gas supply at pneumatic system inlet 2402. A back and forth linear movement of dual action piston 2457 may be converted into electrical energy within generator 2461, which may include a magnet driven back and forth within an electrical coil, as but one example.

In this way, a PN/E with a dual action pneumatic piston may translate piston movement into electrical energy.

While a PN/E transducer may be turbine based, ballast based, diaphragm based, or pneumatic piston based, in still other embodiments, such a transducer may utilize a piezoelectric effect to generate electricity. One such example is shown in FIGS. 25.

Figure 25:
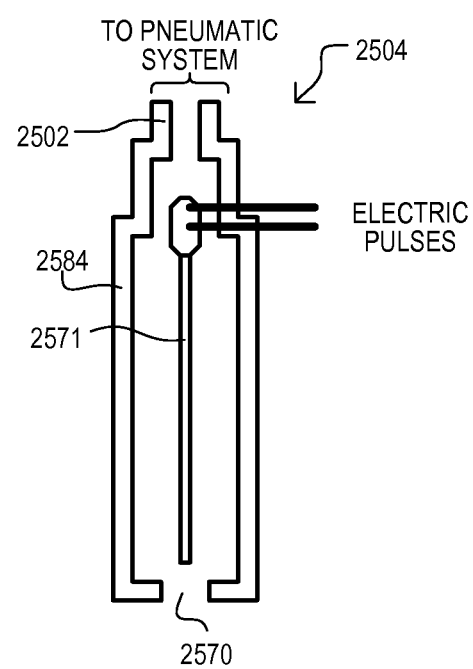
FIG. 25 is a block diagram of a piezoelectric based PN/E transducer according to an embodiment.

Referring to FIG. 25, a piezoelectric based PN/E transducer is shown in a block diagram and designated by the general reference character 2504. A PN/E transducer 2504 may include an enclosure 2584 and a piezoelectric strip 2571. A pressurized gas may be allowed to flow into enclosure 2584 from pneumatic system inlet 2502, across piezoelectric strip 2571 and out exhaust 2570. Such a flow may induce oscillations in piezoelectric strip 2571. Oscillations in piezoelectric strip 2571 may generate voltage changes, due to the piezoelectric effect, which may be harvested as electrical energy.

Embodiments may include any of several ways to introduce oscillations in a piezoelectric strip. In one particular embodiment, a natural frequency of oscillation may be established based on Bernoulli's principal (blow a gas past one side of the strip, causing a reduction in pressure, which may make the strip bend in that direction). A tensile force of the strip may then cause the strip to spring back in the other direction, and a natural oscillation may be established. In one other particular embodiment, aerodynamic elements and/or deflectors may be added to a piezoelectric strip structure to create force or turbulence to flex the strip and establish oscillations.

In this way a PN/E transducer may include a piezoelectric element that may be subject to tensile or compressive stress from a pneumatic system gas flow.

It is noted that while particular embodiments above have shown magnets that may move within electrical coils, alternate embodiments may include magnets that may move adjacent to coils to induce a current.

It should be appreciated that in the foregoing description of exemplary embodiments, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention can be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. An energy harvesting device, comprising:
   a pneumatic system inlet configured to receive a pressurized gas;
   a flow control device coupled to the pneumatic system inlet, wherein the flow control device is configured to increase a flow velocity of the pressurized gas;
   a pneumatic-to-electrical (PN/E) transducer that converts the flow of the pressurized gas into generated electrical energy; and
   an electrical device coupled to receive the electrical energy of the PN/E transducer.

2. The device of claim 1, further including:
   an electrical energy storage device coupled to the PN/E transducer.

3. The device of claim 1, further including:
   a pneumatic device executes mechanical functions in response to at least the flow of the pressurized gas.

4. The device of claim 1, wherein:
   the PN/E transducer comprises a turbine that rotates in response to the flow of pressurized gas to generate the electrical energy.

5. The device of claim 4, further including:
   a controller circuit electrically coupled to the turbine that records counts of impeller rotations of the turbine.

6. The device of claim 4, wherein the flow control device comprises:
   a pneumatic start assist device configured to provide an initial flow of pressurized gas having a greater flow rate than a subsequent flow of the pressurized gas converted into electrical energy.

7. The device of claim 4,
   wherein the flow control device comprises a nozzle constrictor configured to increase the flow velocity of the pressurized gas by constricting the received flow of gas to generate the flow of the pressurized gas converted into electrical energy.

8. The device of claim 1, wherein:
   the PN/E transducer comprises a piezoelectric system that includes a chamber, and a piezoelectric element disposed within the chamber that generates electrical energy in response to being deformed by the application of the flow of pressurized gas.

9. The device of claim 1, wherein:
   the PN/E transducer further includes a diagnosis circuit that provides a low generation indication when electrical energy generated by conversion of the flow of pressurized gas falls below a predetermined level.

10. The device of claim 6, wherein the start assist device further comprises:
    a ballast chamber configured to store gas; and
    a gas valve coupled with the ballast chamber, wherein the gas valve is configured to release the stored gas to assist an initial rotation of the turbine.

11. The device of claim 1, wherein the flow control device is further configured to dynamically regulate consumption of the pressurized gas by the harvesting device based on a rotation rate of the turbine.

12. The device of claim 4, further comprising an electronic start assist device configured to assist an initial rotation of the turbine during a period of time during which the electronic start assist device is energized.

13. The device of claim 8, wherein the piezoelectric element is configured to physically deform in response to an air pressure differential caused by the flow of pressurized gas past a primary surface of the piezoelectric element.

14. An energy harvesting device, comprising:
    a pneumatic system inlet configured to receive a pressurized gas;
    a chamber coupled with the pneumatic system inlet;
    one or more valves coupled with the at least one chamber, wherein the one or more valves are configured to regulate a flow of the pressurized gas into and out of the chamber;
    a pneumatic-to-electrical (PN/E) transducer comprising a mechanical element configured to move in response to increasing pressure in the chamber, wherein the PN/E transducer is configured to generate electrical energy from the movement of the mechanical element; and
    an electrical device coupled to receive the electrical energy of the PN/E transducer.

15. The device of claim 14, wherein:
    the PN/E transducer comprises a ballast system that includes at least first chamber,
    a magnet,
    an electrical coil formed around the first chamber, and
    a pneumatic supply section that supplies a burst of pressurized gas from the flow of pressurized gas to induce the magnet to travel with respect to the electrical coil to thereby generate at least one electrical pulse.

16. The device of claim 14, wherein:
    the PN/E transducer comprises a diaphragm system that includes a magnet,
    an electrical coil, and
    a vent valve, and wherein the mechanical element comprises a diaphragm that displaces the magnet in opposing directions with respect to the electrical coil in response to a pressure chamber being pressurized in response to the flow of pressurized gas and vented by the vent valve.

17. The device of claim 14, wherein the PN/E transducer comprises a pneumatic piston system that includes a chamber, wherein the mechanical element comprises a piston disposed within the chamber, and wherein the PN/E transducer further comprises at least a first valve that applies the flow of pressurized gas to a first side of the piston.

18. The device of claim 15, wherein the ballast system further comprises a relief valve configured to automatically release the burst of pressurized gas from the first chamber in response to a pressure within the first chamber reaching a predetermined pressure level.

19. The device of claim 17, further comprising a magnet coupled with the piston, wherein the magnet is configured to induce current in an electrical coil in response to motion of the piston.

20. The device of claim 14, wherein the PN/E transducer comprises one or more piezoelectric elements configured to generate electrical energy in response to physical deformation of the one or more piezoelectric elements caused by motion of a diaphragm coupled with the one or more piezoelectric elements.

* * * * *